(12) United States Patent
Koljonen

(10) Patent No.: US 9,770,039 B2
(45) Date of Patent: Sep. 26, 2017

(54) FISH BONE REMOVAL APPARATUS

(71) Applicant: CASTEMA Innovations AB, Uppsala (SE)

(72) Inventor: Kari Koljonen, Uppsala (SE)

(73) Assignee: CASTEMA Innovations AB, Uppsala (SE)

( * ) Notice: Subject to any disclaimer, the term of this patent is extended or adjusted under 35 U.S.C. 154(b) by 0 days.

(21) Appl. No.: 15/117,007

(22) PCT Filed: Jan. 14, 2015

(86) PCT No.: PCT/SE2015/050021
§ 371 (c)(1),
(2) Date: Aug. 5, 2016

(87) PCT Pub. No.: WO2015/119551
PCT Pub. Date: Aug. 13, 2015

(65) Prior Publication Data
US 2017/0172166 A1    Jun. 22, 2017

(30) Foreign Application Priority Data
Feb. 6, 2014    (SE) ...................................... 1450122

(51) Int. Cl.
*A22C 25/00*    (2006.01)
*A22C 25/16*    (2006.01)

(52) U.S. Cl.
CPC .................................. *A22C 25/166* (2013.01)

(58) Field of Classification Search
CPC ...... A22C 25/16; A22C 25/163; A22C 25/166
(Continued)

(56) References Cited

U.S. PATENT DOCUMENTS 3,659,638 A * 5/1972 Paoli ....................... B02C 18/00
 241/74
4,893,378 A * 1/1990 Hazenbroek ....... A22C 21/0076
 452/136

(Continued)

FOREIGN PATENT DOCUMENTS

CA        2172418 A1    9/1996
DE        2641427 A1    5/1977
(Continued)

*Primary Examiner* — Richard Price, Jr.
(74) *Attorney, Agent, or Firm* — Dilworth & Barrese, LLP

(57) ABSTRACT

The present invention relates to a fish bone removal apparatus comprising a frame (1), a picking member (9) rotatably mounted in relation to the frame about a rotational axis (3), and an actuator arranged to rotate the picking member in a rotational direction. The picking member comprises a first and a second rotating element (10, 12) arranged to form a wedge-shaped gap (24) between them for receiving a bone. The wedge-shaped gap is tapered in a direction opposite the rotational direction of the picking member. The first rotating element is disc shaped and has two parallel radial surfaces and an outer circumferential surface (11*c*). The second rotating element (12) comprises a bent elongated body having a periphery with a bending radius corresponding to the bending radius of a periphery of the first rotating element, two radial surfaces and an outer circumferential surface (22). The radial surfaces of the first rotating element are arranged in parallel with a plane perpendicular to the first rotational axis, and the radial surfaces of the second rotating element are arranged angled to said plane, so that the outer circumferential surface (22) of the second rotating element is tapered in the rotational direction of the picking member. The first and second rotating element are disposed so that one of the radial surfaces of the first rotating element faces one of the radial surfaces of the second rotating element, and (Continued)

so that the periphery of the first rotating element and the periphery of the second rotating element are positioned on the same distance from the first rotational axis.

8 Claims, 8 Drawing Sheets

(58) Field of Classification Search
USPC .......................................................... 452/135
See application file for complete search history.

(56) References Cited

U.S. PATENT DOCUMENTS

| | | | |
|---|---|---|---|
| 5,067,926 A * | 11/1991 | Richburg | ............... A22C 17/04 241/74 |
| 5,338,250 A * | 8/1994 | Swilley | .............. A22C 17/0046 452/127 |
| 6,123,614 A * | 9/2000 | Kozycki | .............. A22C 25/166 452/135 |
| 6,142,862 A | 11/2000 | Dalgord et al. | |
| 7,927,194 B2 * | 4/2011 | Jurs | ........................ A22C 25/16 452/135 |
| 2003/0109210 A1 | 6/2003 | Jacobsen et al. | |
| 2006/0105691 A1 | 5/2006 | Schneider | |
| 2007/0123156 A1 | 5/2007 | Shipman | |

FOREIGN PATENT DOCUMENTS

| | | |
|---|---|---|
| JP | 2001-61404 A | 3/2001 |
| SE | 9501034-4 A | 9/1996 |
| WO | 92/12641 A1 | 8/1992 |
| WO | 94/10848 A1 | 5/1994 |
| WO | 99/41991 A1 | 8/1999 |
| WO | 02/07522 A2 | 1/2002 |
| WO | 2008/020786 A1 | 2/2008 |

* cited by examiner

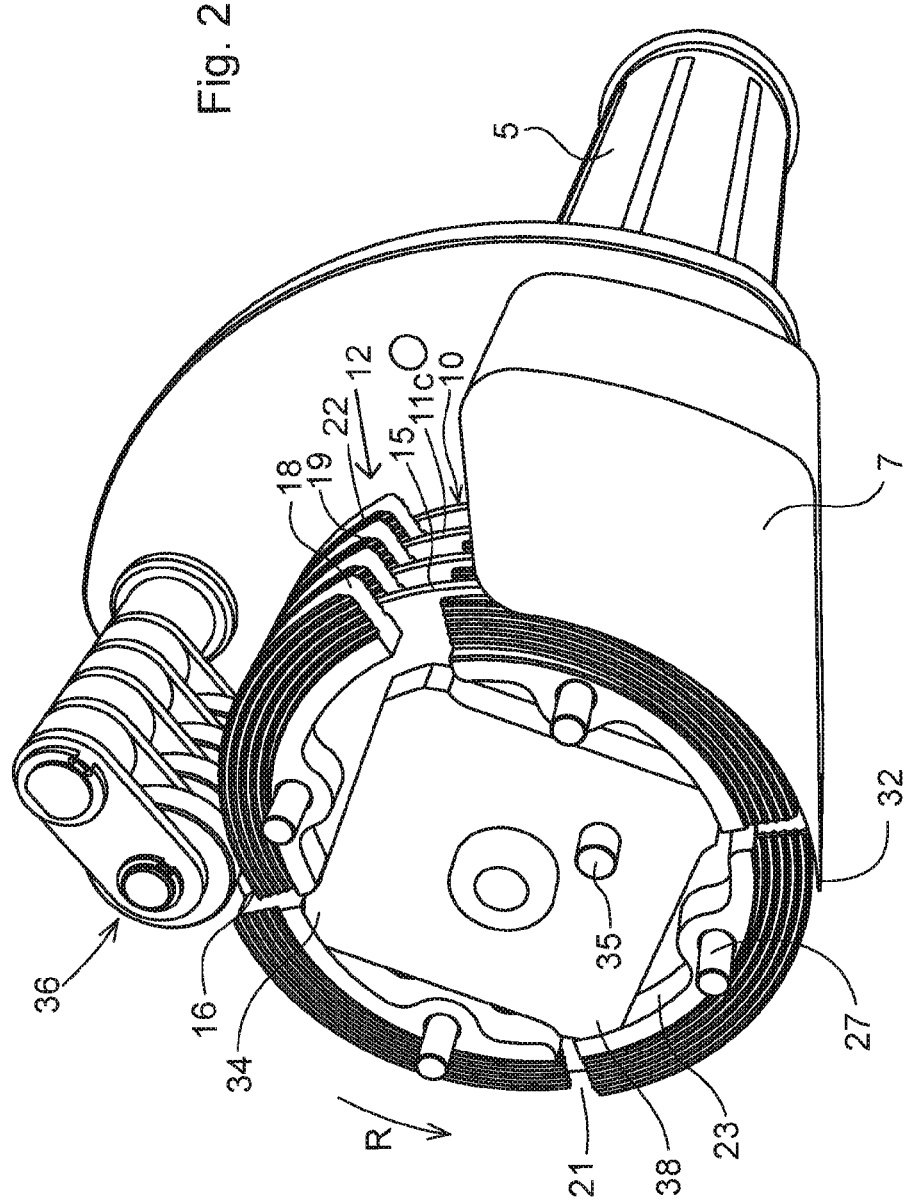

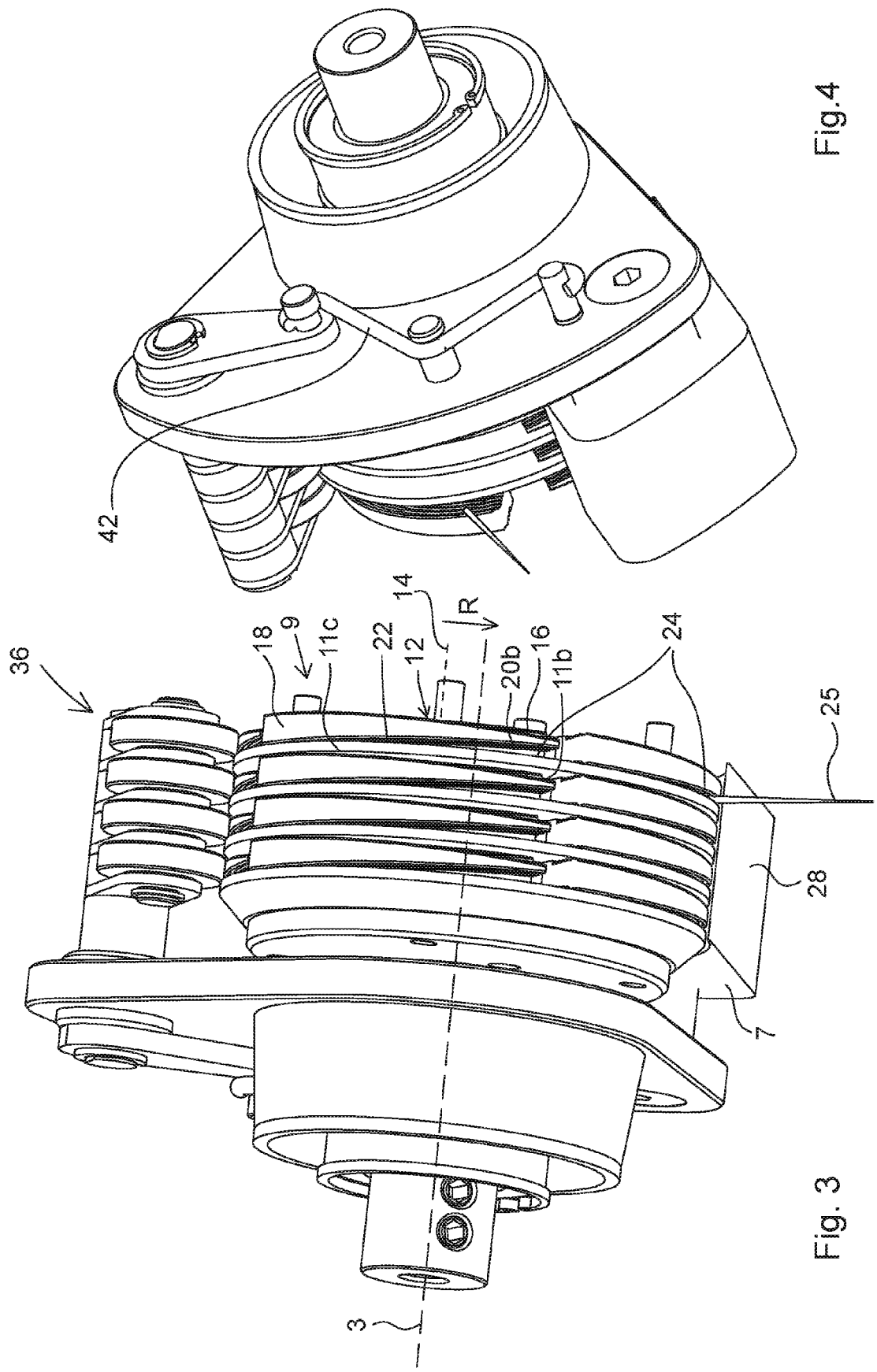

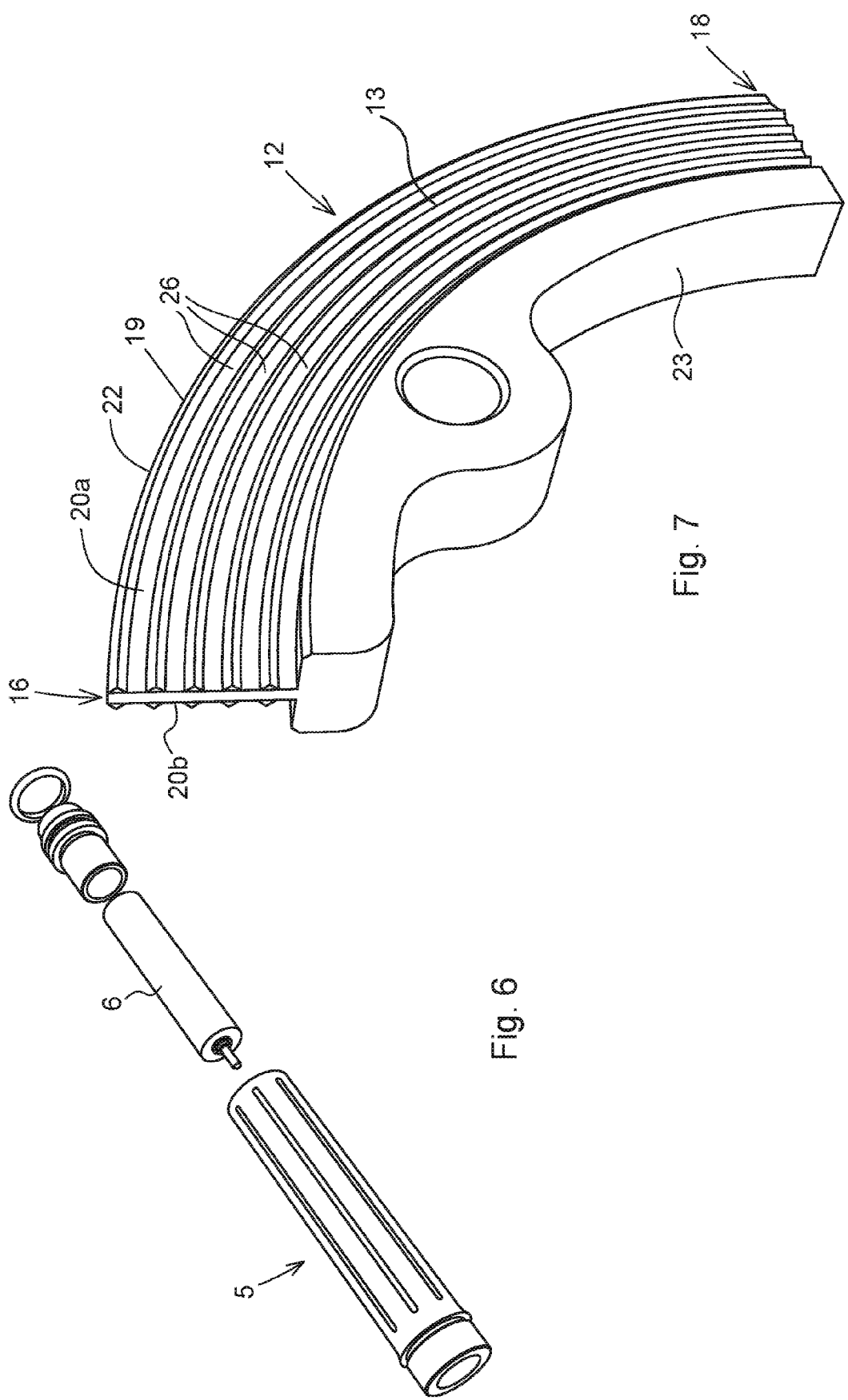

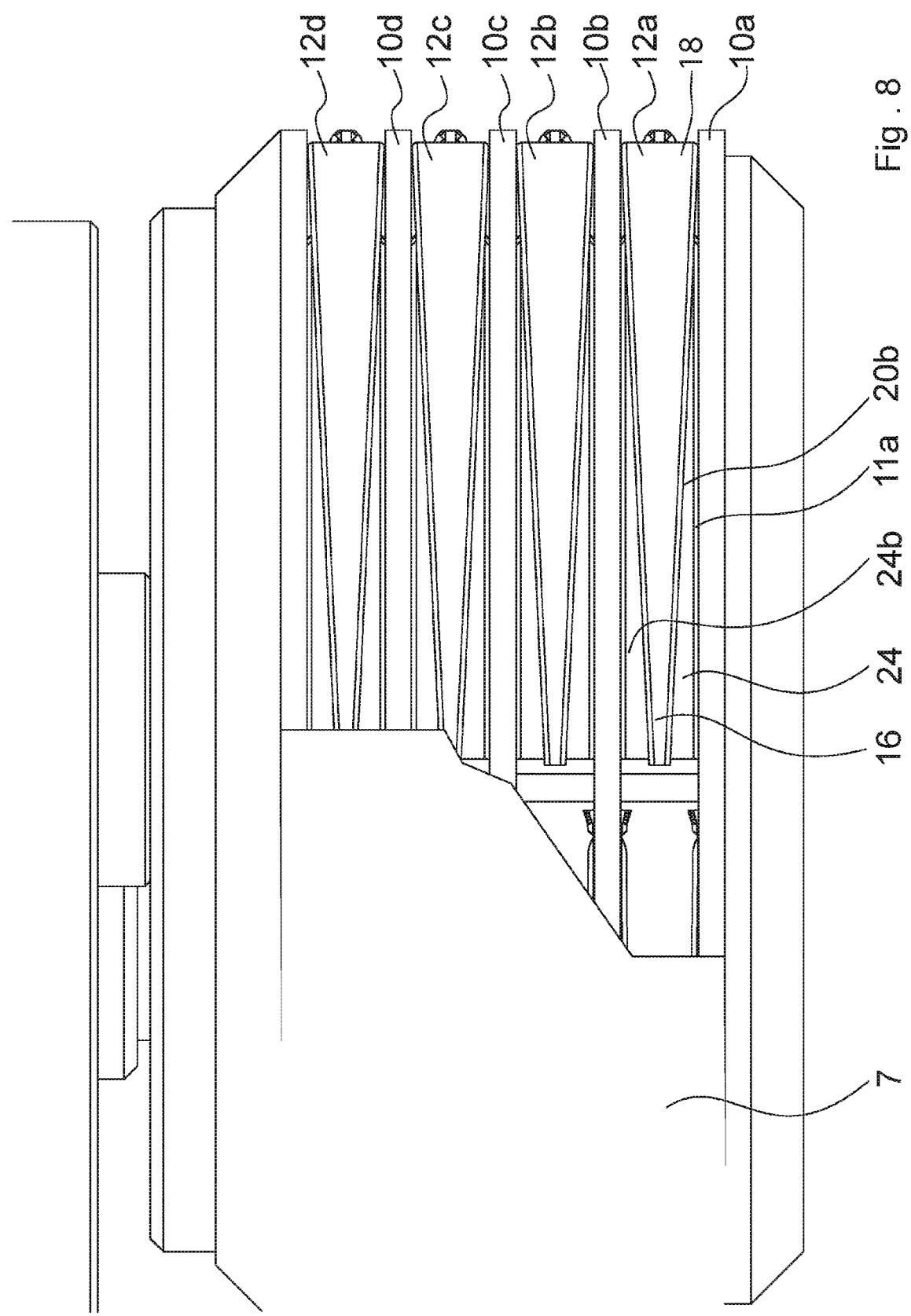

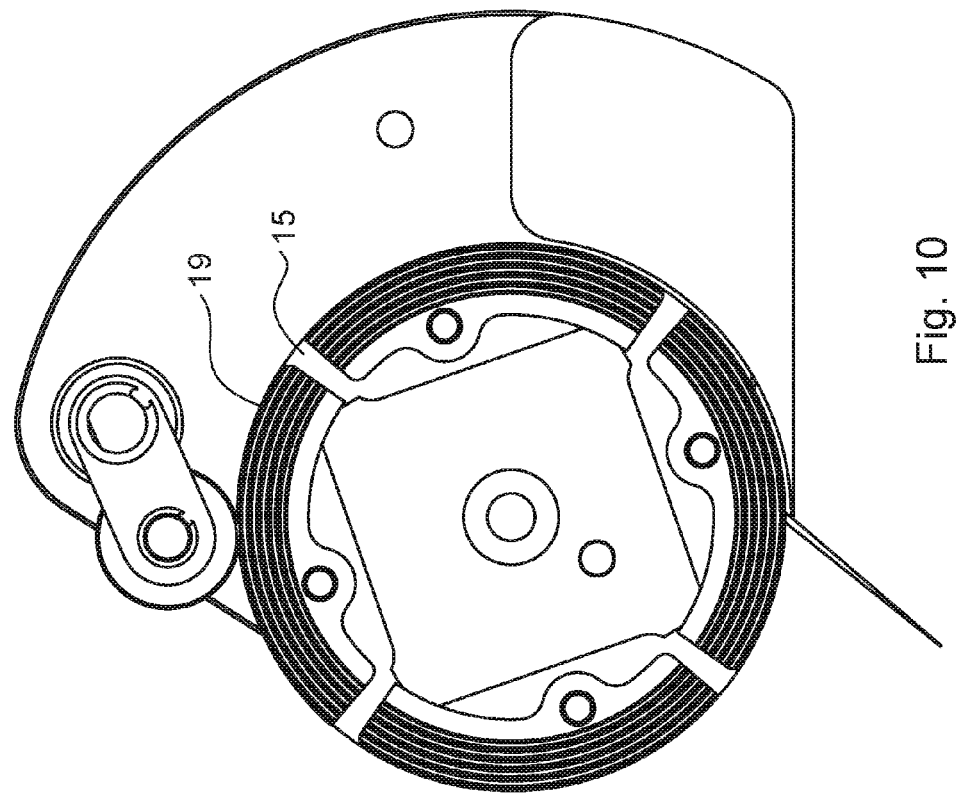
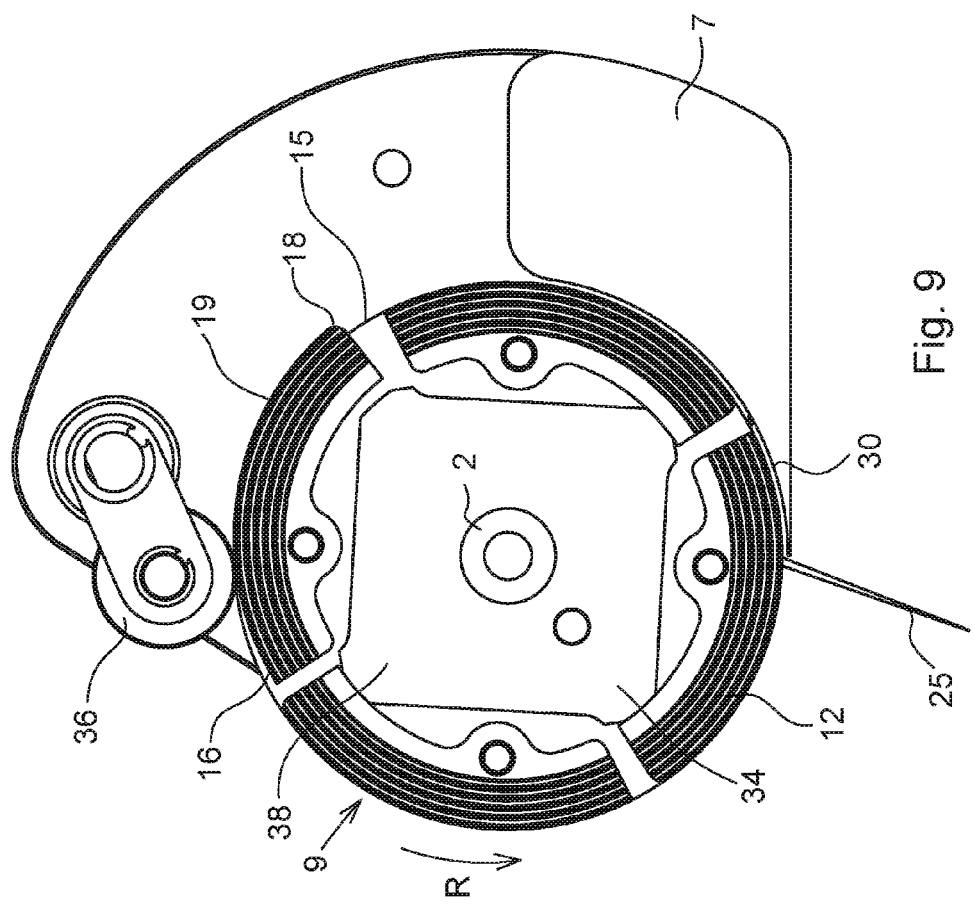

FISH BONE REMOVAL APPARATUS

FIELD OF THE INVENTION

The present invention relates to a fish bone removal apparatus for removal of bones from a fish body. The present invention particularly relates to a fish bone removal apparatus for removal of pin bones from a fish body.

BACKGROUND OF THE INVENTION AND PRIOR ART

The preparation of fish fillet is a time consuming and cumbersome process. Especially, removing bones from the meat can be problematic, because these bones are attached to the meat. Some fishes, such as white fishes have rather thin bones that break easily during the preparation process. This is especially true for pin bones extending from the bigger bones that run along the length of the fish.

Different apparatus have been developed for the removal of bones from meat. Usually, a fish is cleaned such that a fish body is obtained comprising half the side of a fish with bones still attached to the meat. This fish body is then processed in a fish bone removal apparatus.

Although known apparatus can be used for removal of bones and pin bones from a fish body, these apparatus are not efficient for use in removal of all pin bones, especially not breakable pin bones, such as pin bones from white fish. Therefore, there is a need for an apparatus that can be used for preparation of fish fillet, whereby all or substantially all the bones, including pin bones, are removed from a fish body. There is a need for reduction of labor cost and time related to the preparation of fish filet, especially for large scale production of fish filet.

WO9941991 discloses a fish bone removal apparatus comprising a picking member having a stack of disc shaped elements that rotate around a rotational axis. A wedge-shaped gap is present on the periphery of the elements between two adjacent elements. A fish body is transported over a belt to the elements of the apparatus. Upon contact of the fish body with the element, the fish bone becomes wedged in the gap and is removed or plucked from the meat during continuous movement of the element upwards relative to the transporting belt. A problem with this apparatus is that it is difficult for the fish bones to get caught by the wedge shaped gap. Another problem with this apparatus is that it is difficult to remove the fish bones from the apparatus when it has been caught by the apparatus. To remove the fish bones from the apparatus, the apparatus, for example, has to be sprayed with water at high pressure. The removal of fish bones causes stop in the production and accordingly loss of money. Another disadvantage with the prior art fish bone removal apparatus is that the peripheries of the discs may cause damages on the fish files, thereby causing wastage of the fish meat.

OBJECT AND SUMMARY OF THE INVENTION

It is an object of the present invention to at least partly overcome the above mentioned problems, and to provide an improved apparatus and improved method for removal of bones, especially pin bones, from a fish body, especially from a fish body of white fish.

The fish bone removal apparatus comprises a frame, a picking member rotatably mounted in relation to the frame about a first rotational axis, and an actuator arranged to rotate the picking member in a rotational direction, and the picking member comprises a first and a second rotating element arranged to form a wedge-shaped gap between them for receiving a bone, and the wedge-shaped gap is tapered in a direction opposite the rotational direction of the picking member. The invention is characterized in that the first rotating element is disc shaped and has two parallel radial surfaces and an outer circumferential surface, the second rotating element comprises an bent elongated body having a periphery with a bending radius corresponding to the bending radius of a periphery of the first rotating element, two radial surfaces and an outer circumferential surface, the radial surfaces of the first rotating element are arranged in parallel with a plane perpendicular to the first rotational axis, and the radial surfaces of the second rotating element are arranged angled to said plane so that the outer circumferential surface of the second rotating element is tapered in the rotational direction of the picking member, and the first and second rotating elements are disposed so that one of the radial surfaces of the first rotating element faces one of the radial surfaces of the second rotating element, and so that the periphery of the first rotating element and the periphery of the second rotating element are positioned on the same distance from the first rotational axis.

The picking member includes a first rotating element having a first radial surface and a second rotating element having a second radial surface facing the first radial surface, and the first and second radial surfaces are arranged to form a wedge-shaped gap between them for receiving a bone. The first radial surface is arranged in parallel with a plane perpendicular to the first rotational axis, and the second surface is arranged angled to the plane perpendicular to the first rotational axis.

By the invention, a wedge-shaped gap is obtained, which makes it easier to catch the bones in the gap and to keep the bones in the gap until the bones have been removed from the fish filet. Tests has proven that a gap formed between a surface arranged in parallel with the rotational axis of the picking member and a surface arranged angled to the rotational axis of the picking member is more efficient to catch fish bones than a gap formed between two surfaces both arranged angled to the rotational direction of the picking member, as shown in the prior art.

According to an embodiment of the invention, the wedge shaped gap has an angle between 2° and 5°, and preferably between 2° and 4°. This narrow angle improves the ability for the picking member to keep the bones in the gap until the bones have been removed from the fish filet.

According to an embodiment of the invention, the first rotating element is a planar disc having two parallel radial surfaces and an outer circumferential surface extending between the radial surfaces. Preferably, the outer circumferential surface of the first rotating element is planar. Thus, the fish filet is not damaged by the first rotating element.

According to an embodiment of the invention, the second rotating element has two radial surfaces converging in the rotational direction of the picking member and an outer circumferential surface extending between the radial surfaces, and the circumferential surface is tapered in the rotational direction of the picking member. Preferably, the outer circumferential surface of the second rotating element is planar. Thus, the fish filet is not damaged by the first rotating element.

Preferably, the outer circumferential surfaces of the first and second rotating elements are planar. The circumferential surfaces of the rotating elements form a planar surface that prevents the fish meat from protruding into the apparatus and accordingly prevents the fish filet from being damaged.

This embodiment of the invention reduces the wastage of fish meat during the bone removing procedure.

According to an embodiment of the invention, the second rotating element is arranged movable in relation to the first rotating element, and the apparatus comprises an influence assembly arranged to move the second rotating element in relation to the first rotating element during a revolution of the picking member between a first position, where the peripheries of the first and second rotating elements are aligned to form said wedge-shaped gap between them, and a second position, where the peripheries of the first and second rotating element are spaced apart in a radial direction to allow the bone to be removed from the picking member. In the first position, the second rotating element is in a normal or equilibrium position, i.e. the second rotating element is not pivoted.

The fish bones are picked when the apparatus is in the first position and the fish bones are removed when the apparatus is in the second position. An advantage is that the fish bones are effectively removed from the apparatus. Therefore, stop in the production due to need of cleaning the apparatus from fish bones are avoided, and accordingly the efficiency of the fish cleaning is increased.

According to an embodiment of the invention, the second rotating element is arranged pivotal about a second rotational axis arranged in parallel with and at a distance from said first rotational axis.

The pivotal movement of the second rotating element ensures a releasing of the fish bones from the picking member in an efficient manner. This prevents the fish bone removal apparatus from becoming jammed with fish bones.

According to another embodiment of the invention, the first rotating element is disc shaped and the second rotating element comprises an elongated body that is bend over a length of the body and has a bending radius corresponding to a bending radius of the periphery of the first rotating element.

The shapes of the peripheries of the rotating elements, especially the surfaces of the peripheries of the elements correspond to each other, thereby allowing for an efficient collaboration between the elements.

According to a further embodiment of the invention, said influence assembly comprises a wheel provided with at least one protrusion arranged to collaborate an inner circumferential surface of the second rotating element and a pushing member arranged to be in movable contact with an outer circumferential surface of the second element.

The influence assembly prevents unnecessary movement of the second rotating element in relation to the first rotating element. The wheel prevents the second rotating element from moving more towards the shaft than would be necessary for the functioning of the fish bone removal apparatus.

According to an embodiment of the invention, said first rotating element is a planar disc and the periphery of the second rotating element is tapered in the rotational direction of the picking member such that said wedge-shaped gap for receiving the bones is formed between the peripheries of the first and second rotating elements. The tapered form on the periphery of the second rotating element advantageous forms a wedge-shaped gap, which gap efficiently receives and holds a bone attached to a fish body. With a planar disc is meant that the disc has two parallel surfaces.

According to another embodiment of the invention, the picking member comprises a third rotating element in the form of a planar disc arranged in parallel with and at a distance from the first rotating element, the second rotating element is arranged between the first and third rotating element, and the second rotating element is wedge-shaped so that wedge shaped gaps for receiving the bones are formed between the periphery of the second rotating element and the peripheries of the first and third rotating elements.

A stack of elements can be formed. The width of the picking member can easily be adjusted to the width of a fish or the scale of a production line by adjusting the number of rotating element.

According to a further embodiment of the invention, the second radial surface of the second rotating element is provided with gripping elements, for example in the form of circumferentially arranged elongated grooves. The gripping elements improve the friction of the surface of the second rotating elements and accordingly improve the grip of the fish bones in the wedge-shaped gap.

According to an embodiment of the invention, the first radial surface of the first rotating element is substantially planar, i.e. without any gripping elements. The combination of a planar surface without any gripping elements and a rough surface provided with gripping elements improves the gripping of the bones and also facilitates the removal of the bones.

According to a further embodiment of the invention, the apparatus comprises a bone guide structure arranged adjacent to the periphery of the picking member and comprising a substantially flat surface adapted to be in contact with a fish body, a concave bone guiding surface enclosing a part of the periphery of the picking member, and an edge formed between the flat surface and the bone guiding surface, and the bone guiding surface is arranged spaced apart from the periphery of the picking member such that a slot for receiving the bones is formed between the bone guiding surface and the picking member.

The bone guide structure assists in efficient removal of the bone from the fish body. The edge contributes to the lifting of the bone from the fish body.

The object of the invention is also achieved by a method comprising the steps of
  transporting a fish body to a fish bone removal apparatus as defined above,
  wedging a fish bone on the fish body in the wedge-shaped gap between the first and second rotating element, during a revolution of the picking member,
  moving the wedged fish bone from the fish body as the fish body is transported past the fish bone removal apparatus and the fish bone is transported in the gap away from the fish body,
  releasing the fish bone from the wedge-shaped gap by a collaboration between the second rotating element and the pushing member during the revolution of the picking member, and
  optionally, removing of the fish bone from the fish bone removal apparatus.

The present invention is particularly useful for removal of pin bones from a fish body,

BRIEF DESCRIPTION OF THE DRAWINGS

The invention will now be explained more closely by the description of different embodiments of the invention and with reference to the appended figures.

FIG. 2 shows a perspective view of the fish bone removal apparatus in FIG. 1 seen from below.

FIG. 3 shows a side view of the fish bone removal apparatus.

FIG. 4 shows a rear view of the fish bone removal apparatus.

FIG. 6 shows an example of an actuator hidden in a handle.

FIG. 7 shows an example of a second rotating element.

FIG. 8 shows the wedge-shaped gaps formed between the first and second rotating elements.

FIG. 9 shows a schematic side view of a fish bone being moved in a wedge-shaped gap.

FIG. 10 shows a schematic side view of a fish bone being moved into a slot.

DETAILED DESCRIPTION OF EMBODIMENTS OF THE INVENTION

A fish bone removal apparatus of the present invention can be used to remove bones and pin bones from fish. Any type of fish can be used in the fish bone removal apparatus. Examples of fish may be salmon, pollack, haddock, mockery, scrod, whitefish, and the like. The fish bone removal apparatus is especially suitable for removal of pin bones, which easily break during removal of the bone from the meat of the fish, such as pin bones from white fishes.

Figure 1:
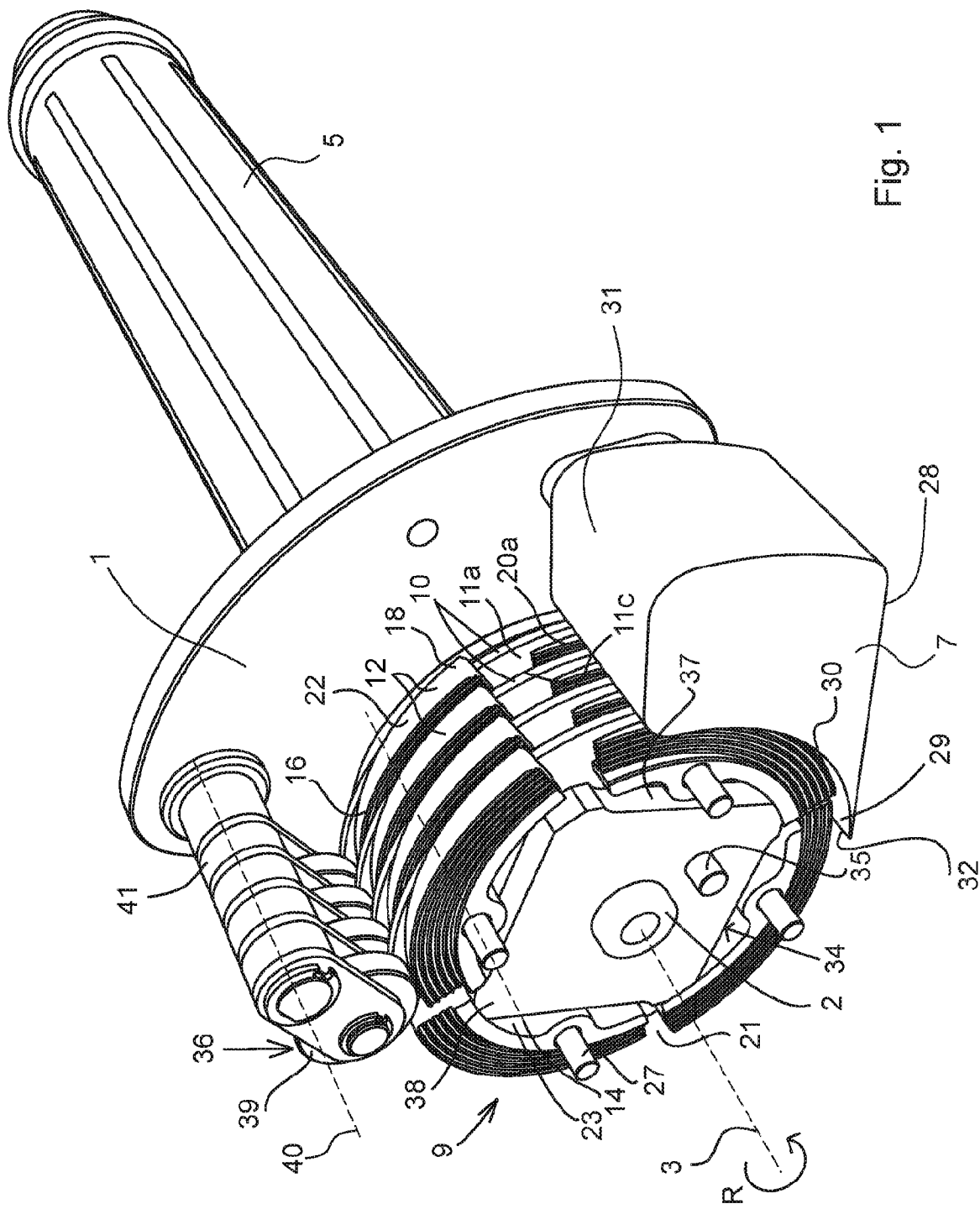
FIG. 1 shows a perspective view of a fish bone removal apparatus according to an embodiment of the present invention seen from above.
Figure 5:
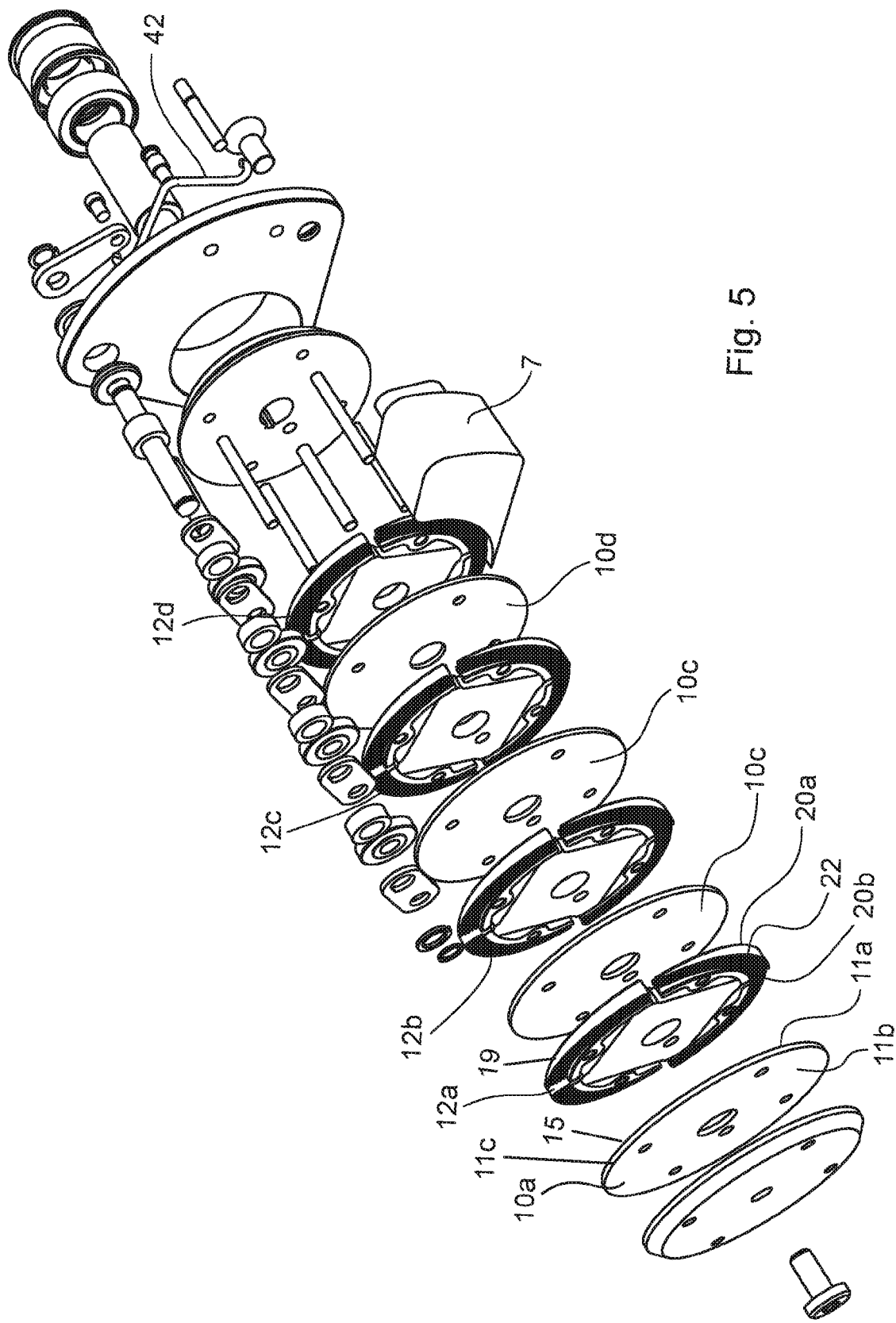
FIG. 5 shows an exploded view of the fish bone removal apparatus.

FIG. 1 shows a perspective view of a fish bone removal apparatus according to an embodiment of the present invention seen from above. FIG. 2 shows a perspective view of the fish bone removal apparatus in FIG. 1 seen from below. FIG. 3 shows a side view of the fish bone removal apparatus. FIG. 4 shows a rear view of the fish bone removal apparatus. FIG. 5 shows an exploded view of the fish bone removal apparatus.

The fish bone removal apparatus comprises a frame 1, and a rotatable shaft 2 that extends along a first rotational axis 3. The apparatus may further comprise a holding member needed for safety, stability or comfort, such as a member to secure the fish bone removal apparatus to a surface or a handle to hold the fish bone removal apparatus. In the embodiment shown in FIG. 1, the holding member is a handle 5. The frame 1 can be designed for attaching a bone guide structure 7 for guiding the fish bones into the apparatus. Preferably, at least one holding member extends traversally or perpendicularly in relation to the first rotational axis.

The fish bone removal apparatus also comprises an actuator 6 adapted to rotate the shaft 2 and a picking member 9 attached to the shaft 2. The actuator is arranged to rotate the picking member 9 in a rotational direction R. The picking member 9 is, for example, cylindrical. The picking member 9 is rotatably mounted in relation to the frame 1 about the first rotational axis 3 extending through a center of the picking member. The actuator may be a motor, such as an electrical or fuel driven motor. The actuator 6 may be comprised in the handle 5 of the fish bone removal apparatus, as shown in FIG. 6. The actuator may allow a rotation speed of the shaft of between 50 to 500 rotations per minute.

The picking member 9 is mounted on the fish bone removal apparatus, more specifically on the shaft 2 of the fish bone removal apparatus such that the picking member rotates when the shaft is rotating. In this embodiment, the picking member has an essentially cylindrical shape. The picking member 9 comprises one or more first rotating elements 10 and one or more second rotating elements 12. The first rotating elements 10 are fixedly connected to the shaft 2. The picking member 9 may further comprise means to attach the first rotating element to the shaft. For example, the first rotating elements 10 can be welded to the shaft.

The first rotating element 10 is formed in the shape of a disc having a substantially circular periphery 15. In this embodiment, the first rotating element 10 is a planar disc having two parallel radial surfaces 11a-b and an outer circumferential surface 11c, as shown in FIG. 5. The width of the outer circumferential surface 11c of the disc is preferably at least 2 mm. The radial surfaces 11a-b are arranged in parallel with the rotational direction of the picking member and orthogonal to the rotational shaft 2. The first rotating element 10 has a hole in substantially a center of the disc, adapted to receive the shaft 2. The first rotating element 10 has a diameter extending from the center of the disc to the periphery 15 of the disc. The periphery 15 has an outer circumferential surface 11c and is bent with a circular bending radius. The first rotating element has further a first and second radial surface 11a-b on each side of the disc. The surfaces extend traversally in relation to the first axis 3, when the first rotating element is mounted on the shaft. The first and/or second radial surface 11a-b may be flat or planar. In one embodiment, the first and second surfaces 11a-b are planar. An edge between the first and/or second surface and the circumferential surface may be sharp or not.

FIG. 7 shows an enlarged view of the second rotating element 12. The second rotating element 12 comprises a bent elongated body 13 having a periphery 19 with a bending radius corresponding to the bending radius of a periphery 15 of the first rotating element, two radial surfaces 20a-b arranged on opposite sides of the elongated body, an outer circumferential surface 22 and an inner circumferential surface 23. The second rotating element 12 has a first end 16 and a second end 18. The radial surfaces 11a-b of the first rotating element 10 are arranged in parallel with a plane perpendicular to the first rotational axis 3 of the picking member, and the radial surfaces 20a-b of the second rotating element 12 are arranged angled to a plane perpendicular to the first rotational axis 3, as shown in FIG. 3. The outer circumferential surface 22 of the second rotating element is tapered in the rotational direction of the picking member.

The second rotating element 12 is positioned in the proximity of the periphery 15 of the first rotating element 10. The second rotating element 12 is connected to the first rotating element 10. In this embodiment of the invention, the second rotating element 12 is movably connected to the first rotating element 10. The second rotating element 12 is pivotally mounted on the first rotating element 10 about a second rotational axis 14, as shown in FIGS. 1 and 2. The first and second rotating elements 10, 12 are disposed so that one of the radial surfaces 11a-b of the first rotating element faces one of the radial surfaces 20a-b of the second rotating element. The first and second rotating elements 10, 12 are disposed so that the periphery 15 of the first rotating element and the periphery 19 of the second rotating element are positioned on the same distance from the first rotational axis. In this embodiment, the periphery 15 of the first rotating element and the periphery 19 of the second rotating element are positioned on the same distance from the first rotational axis when the second rotating element is in a normal or equilibrium position, i.e. not pivoted. Thus, the outer circumferential surface 22 of the second rotating element and the outer circumferential surface 11c of the first rotating element are leveled with each other when the second rotating element is in a normal position and not pivoted.

The second rotating element 12 has a second radial surface 20b facing the first radial surface 11a of the first rotating element 10. The first radial surface 11a and the second radial surface 20b are arranged to form a wedge-shaped gap 24 between them for receiving a bone 25, as seen from FIG. 3. The wedge-shaped gap 24 is tapered in a direction opposite the rotational direction of the picking member, as shown in FIG. 3. The radial surfaces 20a-b of the second rotating element 12 are angled relative to the rotational direction of the picking member. The two radial surfaces 20a-b of the second rotating element are converging in the rotational direction R of the picking member and the outer circumferential surface 22 is tapered in the rotational direction R of the picking member.

The elongated body 13 is bent over the entire length of the body. The bending radius is such that the curved shape of the elongated body 13 corresponds with the circular bending radius of the periphery 15 of the first rotating element 10. The length of the second rotating element is such that two to eight second rotating elements 12 can be attached on the radial surface of the first rotating element 10. Preferably, four second rotating elements 12 are attached to one first rotating element, as shown in the figures. The width of the second rotating element is such that a secure and functional attachment on the first rotating element is provided. A distance 21 is present between a first end 16 of the second rotating element and a second end 18 of a subsequent or adjacent second rotating element. The distance 21 between two adjacent second rotating elements is large enough to allow pivotal movement of the second rotating element.

The first and second radial surfaces 20a-b of the second rotating element 12 may be provided with gripping elements. The gripping elements may be any means that assist in the gripping of a bone. One example may be grooves 26, such as grooves extending along the length of the second rotating element and parallel to the bended circumferential surfaces. One or more grooves may be provided on the first surface. FIG. 7 shows a first radial surface 20a on the second rotating element having five parallel grooves 26.

The body 13 of the second rotating element 12 is tapered in a rotational direction of the picking member to form a wedge-shaped gap 24 between the first and second rotating elements 10, 12 as shown in FIG. 8. Thus, the width of the second rotating element 12 is smaller at the first end 16 and then becomes gradually thicker along the direction towards the second end 18 of the second rotating element. When the second radial surface 20b of the second rotating element is adjacent to the first radial surface 11a of the first rotating element, a wedge-shaped gap 24 is formed between said surfaces. As seen from FIG. 8, the wedge shaped gap 24 has the shape of a right-angled triangle.

The second rotating element 12 is attached to the first rotating element 10 using pivotally attachment means 27. The second radial surface 20b of the second rotating element 12 is attached to a first radial surface 11a of the first rotating element 10. The second rotating element 12 is allowed to move in relation to the first rotating element 10 about a second rotational axis 14. The second rotational axis 14 is arranged parallel to and at a distance from the first rotational axis 3. In a first position of the second rotating element, as shown in FIG. 3, the outer circumferential surface 22 of the second rotating element 12 is parallel and aligned to the circumferential surface 11c of the first rotating element 10. The second rotating element 12 may be allowed to move to a second position, as shown in FIG. 2, whereby the circumferential surface 11c of the first rotating element and the outer circumferential surface 22 of the second rotating element 12 become spaced apart in a radical direction. In this second position, the first end 16 of the second rotating element 12 may be pushed down in a direction towards the shaft 2 and the second end 18 of the second rotating element may be moved up in a direction away from the shaft, as shown in FIG. 2. For an improved functioning of the picking member 9, the second rotational axis 14 is preferably not provided in the middle of the length of the elongated body, but slightly off center, such as on about one third of the length from the first end of the body of the second rotating element.

In the first position, when the circumferential surfaces are aligned, a wedge-shaped gap 24 is formed between the peripheries of the first rotating element and the second rotating element, and especially between the first radial surface 11a of the first rotating element and the second radial surface 20b of the second rotating element.

The picking member 9 may comprise a plurality of first rotating elements 10 and a plurality of second rotating elements 12. The picking member 9 may comprise a plurality of rotating elements 10a-d, 12a-d, as shown in FIG. 5. Subsequent rotating elements 10b-d and 12a-d are positioned parallel to and at a distance from a first rotating element 10a. The second rotating elements 12a-d are positioned between the first rotating elements 10a-b. This way a wedge-shaped gap 24a-b is present on both sides of the second rotating element 12a, one gap 24a between the periphery of the first rotating element 10a and the second rotating element 12a, and another gap 24b between the second rotating element 12a and the periphery of the second rotating element 10b, as seen from FIG. 8. The outer circumferential surface 22 of the second rotating element is tapered on two sides of said circumferential surface. A stack of rotating elements 10, 12 can be formed. The stack of rotating elements has preferably at least the width of the body of a fish that is to be treated by the fish bone removal apparatus.

The fish bone removal apparatus also comprises a bone guide structure 7 as shown in FIG. 1. The bone guide structure 7 is arranged adjacent to the periphery of the picking member 9. The bone guide structure 7 comprises a substantially flat surface 28 adapted to be in contact with a fish body and a concave bone guiding surface 29. The concave bone guiding surface 29 forms a slot 30 arranged to receive a bone between the bone guide structure 7 and the circumferential surfaces 11c, 22 of the picking member. An edge 32 is formed between the flat surface and the bone guiding surface. The bone guide structure may further comprise a flat upper surface 31 adapted to receive bones that have passed through the slot.

The fish bone removal apparatus also comprises an influence assembly arranged to move the second rotating element 12 in relation to the first rotating element 10 during a revolution of the picking member 9 in order to remove the bones from the picking member, after the bones have passed through the slot 30. The influence assembly comprises a wheel 34 and a pushing member 36, which collaborate to move the second rotating element 12 relative to the first rotating element 10 in a radial direction, to and from the shaft 2, by moving the first end 16 of the second rotating element towards the shaft and then the second end 18 of the second rotating element away from the shaft.

The wheel 34 is positioned parallel to the rotating elements 10, 12 and rotates around the shaft 2 in the rotational direction together with the rotating elements. The wheel 34 may be attached to the first rotating element 10 using an attachment means 35. The wheel 34 does not move relative to the first or second rotating elements. The wheel 34 comprises a first and a second surface on each side of a circumferential surface 37 of the wheel and a hole in substantially a center of the wheel to receive the shaft 2. The circumferential surface 37 of the wheel comprises one or more protrusion 38. The protrusions 38 are adapted to collaborate with the inner circumferential surface 23 of the second rotating element, as shown in FIG. 2.

The diameter of the wheel 34 is such that the protrusion 38 is in contact with the inner circumferential surface 23 in the proximity of or at the second end 18 of the second rotating element when the second rotating element is in a first position, as shown in FIG. 2. The diameter of the wheel 34 next to the protrusion 38 is such that the circumferential surface of the wheel is in contact with the inner circumferential surface 23 in the proximity of or at the first end 16 of the second rotating element, when the second rotating element is in a second position. The wheel has at least one protrusion 38 per each second rotating element 12. The specific shape of the circumferential surface 37 of the wheel limits the movement of the second rotating element in a radial direction towards the shaft.

The pushing member 36 of the influence assembly is positioned next to the picking member 9 in a radial direction. The pushing member 36 is pivotal about a third rotational axis 40 positioned parallel to and at a distance from the first and second rotational axes 3, 14. The pushing member 36 comprises at least one rotating wheel 39 that rotates along an axis in parallel to the third rotational axis 40. The rotating wheel 39 is positioned such that the circumferential surface of the wheel can be in contact with the outer circumferential surface 22 of the second rotating element 12 on the picking member. The at least one rotating wheel 39 rotates in the opposite direction from the rotational direction. The at least one rotating wheel is attached to a pushing member holding element 41. This holding element 41 may be attached to the frame 1 of the fish bone removal apparatus. The pushing member holding element 41 may, for example, be attached to a traversally orientated holding member of the frame 1, as shown in FIG. 1.

The pushing member 36 is preferably pivotally attached to the frame 1. Hereby, the rotating wheel 39 can move in a radial direction in relation to the first rotational axis 3 to and from the outer circumferential surface 22 of the second rotating element. The rotating wheel 39 of the pushing member may be in constant contact with the outer circumferential surface 22 of the second rotating element. The at least one rotating wheel 39 of the pushing member 36 pushes the first end 16 of the second rotating element in the radial direction towards the shaft 2 and by that the second end 18 is moved in the radial direction away from the shaft 2 and away from the first rotating element 10, as shown in FIG. 2. The second rotating element 12 is thereby in the second position and the peripheries of the first and second rotating element are spaced apart in a radial direction to allow a bone to be removed from the picking member. To provide sufficient pushing force, a spring 42 may be provided on the pivotally holding element 41 of the pushing member 36.

A pushing member 36 may comprise a plurality of rotating wheels separated from each other at a distance along the rotational axis that corresponds with the distance along the same axis between the second rotating elements of the picking member, such that each rotating wheel can collaborate or contact a second rotating element.

Method of Using the Fish Bone Removal Apparatus.

Figure 11:
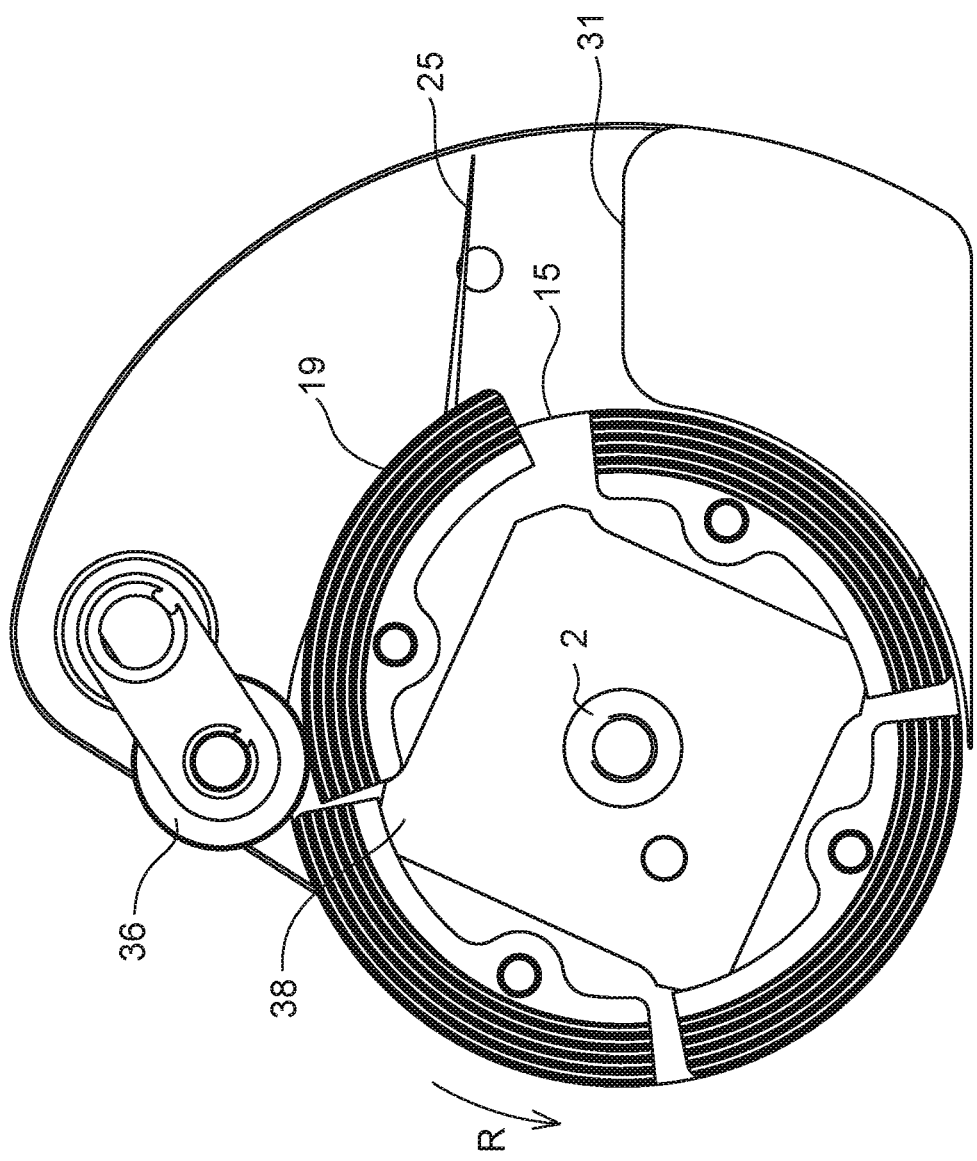
FIG. 11 shows a schematic side view of a fish bone being removed from the wedge-shaped gap.

A method of using the fish bone removal apparatus will know be described with reference to FIGS. 9-11. The fish bone removal apparatus is used to remove bones from a fish body. The fish body is usually a flat half body of a fish with a skin outer side and an inner side comprising the bones of the fish. The fish body is transported to the fish bone removal apparatus on a transporting belt. The fish body is positioned such that the skin outer side is orientated towards the belt. The inner side of the fish body is allowed to come into contact with the picking member 9 and the edge 32 and flat surface 28 of the bone guide structure 7.

When the fish body moves on the moving belt towards the fish bone removal apparatus it arrives under the picking member 9 towards to edge 32 of the bone guiding structure. A pressure on the fish body may be provided by the picking member 9 in order to assist lifting of the bone 25 from the meat of the fish body. At the edge 32, the fish bone 25 becomes disposed in the wedge-shaped gap 24 between the circumferential surfaces of the first rotating element 10 and the second rotating element 12, as shown in FIG. 9. During the relative movement of the fish body in relation to the picking member, the bone 25 becomes wedged in the end of the gap 24 as the fish bone and the end of the gap move closer together, as shown in FIG. 10. The wedged fish bone is removed or plucked from the meat of the fish as the fish moves along the belt. The fish bone is moved into and through the slot 30 between the picking member 9 and the bone guide structure 7. The gripping elements 26 present on the surface of the second rotating element 12 may assist in securing the fish bone in the wedge-shaped gap.

The rotational movement of the picking member 9 then moves the first rotating element 10 and the second rotating element 12, holding the fish bone, towards the pushing member 36. The pushing member pushes the first end 16 of the second rotating element down towards the shaft (i.e. into the second position). This results in an upward movement of the second end 18 of the second rotating element 12, away from the shaft 2 relative to the first rotating element 10. The upward movement of the second end 18 releases the wedged fish bone 25 from the gap 24, as shown in figured 11. The fish bone 25 may be collected on the upper surface 31 of the bone guide structure 7. The fish bones may be removed from the fish bone removal apparatus or said upper surface by using a flow of air or water.

The rotational movement of the picking member 9 then moves the second rotating element 12 past the pushing member 36 to arrive in the first position after having passed the pushing member. The second rotating element 12 then moves along the rotation direction towards the belt, where after the cycle of removing fish bones from a fish body can start again.

The shape of the circumferential surface 37 of the wheel 34 prevents the second rotating element 12 to be moved in the direction of the shaft 2 more than needed for the removal of the fish bone from the picking member.

The rotational speed of the picking member and the transporting speed of the belt are correlated such that fish bones can efficiently and effectively be removed from fish bodies that pass the picking member.

The number of first and second rotating element of the picking member and the diameter of the first rotating element can be adjusted to the width of the fish body.

The invention claimed is:

1. A fish bone removal apparatus comprising a frame (1), a picking member (9) rotatably mounted in relation to the frame about a first rotational axis (3), and an actuator (6) arranged to rotate the picking member in a rotational direction (R), and the picking member comprises a first and a second rotating element (10, 12: 10*a-d*, 12*a-d*) arranged to form a wedge-shaped gap (24) between them for receiving a bone, and the wedge-shaped gap is tapered in a direction opposite the rotational direction of the picking member, wherein the first rotating element is disc shaped and has two parallel radial surfaces (11a-b) and an outer circumferential surface (11c), the second rotating element (12) comprises an bent elongated body (13) having a periphery (19) with a bending radius corresponding to the bending radius of a periphery (15) of the first rotating element, two radial surfaces (20a-b) and an outer circumferential surface (22), the radial surfaces of the first rotating element are arranged in parallel with a plane perpendicular to the first rotational axis, and the radial surfaces of the second rotating element are arranged angled to said plane, so that the outer circumferential surface (22) of the second rotating element is tapered in the rotational direction of the picking member, and the first and second rotating elements are disposed so that one of the radial surfaces of the first rotating element faces one of the radial surfaces of the second rotating element, and so that the periphery of the first rotating element and the periphery of the second rotating element are positioned on the same distance from the first rotational axis.

2. The apparatus according to claim 1, wherein the second rotating element (12) is arranged pivotally about a second rotational axis (14) arranged in parallel with and at a distance from said first rotational axis (3).

3. The apparatus according to claim 2, wherein the second rotating element (12) is arranged movable in relation to the first rotating element (10), and the apparatus comprises an influence assembly (34, 36) arranged to move the second rotating element in relation to the first rotating element during a revolution of the picking member between a first position, where the peripheries (15,19) of the first and second rotating elements are aligned to form said wedge-shaped gap (24) between them and a second position, where the peripheries of the first and second rotating element are spaced apart in a radial direction to allow the bone to be removed from the picking member.

4. The apparatus according to claim 3, wherein said influence assembly comprises a wheel (34) provided with at least one protrusion (38) arranged to collaborate with an inner circumferential surface (23) of the second rotating element (12) and a pushing member (36) arranged to be in movable contact with an outer circumferential surface (22) of the second rotating element.

5. The apparatus according to claim 1, wherein the first rotating element (10a) is a planar disc, the picking member (9) comprises a third rotating element (10b) in the form of a planar disc arranged in parallel with and at a distance from the first rotating element (10a), the second rotating element (12) is arranged between the first and third rotating elements, and the second rotating element is wedge-shaped so that wedge shaped gaps (24a-b) for receiving the bones are formed between radial surfaces (20a-b) of the second rotating element and radial surfaces (11a-b) of the first and third rotating elements.

6. The apparatus according to claim 1, wherein said second radial surface (20b) of the second rotating element (12) is provided with gripping elements (26).

7. The apparatus according to claim 6, wherein said gripping elements (26) comprises circumferentially arranged elongated grooves.

8. The apparatus according to claim 1, wherein the apparatus comprises a bone guide structure (7) arranged adjacent to the periphery (15, 19) of the picking member and comprising a surface (28) adapted to be in contact with a fish body, a concave bone guiding surface (29) enclosing a part of the periphery of the picking member, and an edge (32) formed between the flat surface and the bone guiding surface, and the bone guiding surface is arranged spaced apart from the periphery of the picking member such that a slot (30) for receiving the bones is formed between the bone guiding surface and the picking member.

* * * * *